United States Patent [19]
Katoh et al.

[11] Patent Number: 5,132,131
[45] Date of Patent: Jul. 21, 1992

[54] METHOD OF TREATING SURFACE OF MOLDED ARTICLE OF THERMOPLASTIC ELASTOMER COMPOSITION

[75] Inventors: Kohichiroh Katoh, Abiko; Hideo Shinonaga, Chiba; Kyoji Suzuki, Ichihara; Satoru Sogabe, Chiba, all of Japan

[73] Assignees: Director-General of Agency of Industrial Science and Technology; Sumitomo Chemical Co., Ltd., both of Japan

[21] Appl. No.: 682,989

[22] Filed: Apr. 10, 1991

[30] Foreign Application Priority Data

Apr. 13, 1990 [JP] Japan ................................. 2-98195

[51] Int. Cl.⁵ .............................................. B05D 3/06
[52] U.S. Cl. .................................. 427/54.1; 427/412.3; 427/444
[58] Field of Search ...................... 427/54.1, 412.3, 444

[56] References Cited
U.S. PATENT DOCUMENTS 4,853,253  8/1989  Katoh .................................. 427/54.1
5,077,082 12/1991  Katoh et al. ........................ 427/54.1

Primary Examiner—Bernard Pianalto
Attorney, Agent, or Firm—Lorusso & Loud

[57] ABSTRACT

A method for treating the surface of a molded article, which comprises a combination of the steps of:

providing a molded article made of a thermoplastic elastomer composition obtained by a thermal treatment of a mixture in the presence of an organic peroxide, which mixture is comprised of (A) an oil-extended olefinic copolymer rubber of an olefinic copolymer rubber having a Mooney viscosity ($ML_{1+4}100°$ C.) of 90–200 and a mineral oil type softening agent, (B) an olefinic plastic, and (C) a bis-maleimide compound, the ratio by weight of (A) the oil-extended olefinic copolymer rubber to (B) the olefinic plastic, A/B, being 24/76–80/20, the content of (C) the bismaleimide compound being 0.1–3 parts by weight based on 100 parts by weight of the total amount of (A) the oil-extended olefinic copolymer rubber and (B) the olefinic plastic, contacting the surface of the molded article with a UV-rays absorbing liquid, and irradiating the surface of the molded article with UV-rays having main wave lengths of 300 nm, or less. According to the surface treatment of the present invention, the olefinic thermoplastic elastomer to which paints can hardly be applied hitherto shows good paintability and printability in addition to the inherent useful properties. Paint-coated molded articles obtained by the method of this invention find wide utility in the fields of various industries, especially in the field of automobile industry as exterior or interior parts.

12 Claims, No Drawings

METHOD OF TREATING SURFACE OF MOLDED ARTICLE OF THERMOPLASTIC ELASTOMER COMPOSITION

BACKGROUND OF THE INVENTION

1. Field of the Invention

The present invention relates to methods for treating and painting the surface of a molded article made of a thermoplastic elastomer composition. More particularly, the present invention relates to methods for treating and painting the surface of a molded article made of a thermoplastic elastomer composition derived from a mixture of an oil-extended olefinic copolymer rubber, an olefinic plastic and a bismaleimide compound in a specific proportion.

2. Description of the Prior Art

Thermoplastic elastomers are already known materials and are steadily finding in recent years increased applications chiefly in the industrial field of motor vehicles and domestic electric appliances, utilizing their non-rigid soft property and such a characteristic that they are moldable by way of extrusion molding or injection molding utilizable for conventional thermoplastic resins.

Among these thermoplastic elastomers, olefinic thermoplastic elastomers possess, in addition to the above mentioned beneficial properties, a low specific gravity, heat-resisting property and a well balance of other physical properties. Accordingly, they are especially useful in the field of auto parts with the tendency of rendering automobiles lightweight. In recent years, they begin to be utilized even as bumpers of automobiles where a large scale injection molding technique is demanded. In bumpers as exterior parts, a mood is seen to make them fashionable by applying a paint thereonto in combination with the body color.

On the other hand, printing of patterns is frequently applied also to domestic electric appliances to enhence their ornamental value.

From the past, compositions comprising olefinic copolymer rubbers and olefinic plastic substances are known as the olefinic thermoplastic elastomers. As they are devoid of polarity, however, a surface treatment for enhancing adhesiveness or paintability of the elastomers is often difficult. In order to improve these properties, a single layer of a primer comprising, for example, a chlorinated polypropylene is generally interposed between the olefinic thermoplastic elasomer and an adhesive or a paint thereby enhancing compatibility between the paint and the elastomer. However, such primer itself is expensive and one step for forming a primer layer is added to the treatment, thus making the cost of the final product higher. Accordingly, an improvement is desired in this respect.

In order to improve adhesiveness of the elastomers, for example, a surface treatment including modification of the surface by etching in a physical or chemical manner is discussed and actually applied to shaped articles made of polypropylene. In this method, however, the effect of improvement is insufficient and some problems are raised in that the treatment is complicated rather than the step for coating a primer and that deformation of the shaped article may take place depending on the condition of etching.

Further, a method for improving paintability is now being adopted wherein the surface of shaped articles is oxidatively polarized by plasma irradiation in place of coating a primer. However, a problem is also involved in this method; the step for plasma irradiation is batch-wise and the treatment condition is not even depending on the shape of the articles. At present, therefore, a satisfactory result is not achieved in connection with imparting polarity to the surface of the olefinic thermoplastic elastomers. Accordingly, there is a great demand for developing a new method for treating the surface of the elastomers effectively without any problem.

BRIEF SUMMARY OF THE INVENTION

Accordingly, it is an object of the present invention to provide a method for treating the surface of thermoplastic elastomer compositions which overcomes all the drawbacks as seen in the prior art method.

It is another object of the present invention to provide a method for treating the surface of thermoplastic elastomer compositiomns to impart thereto excellent adhesiveness and paintability.

It is still another object of the present invention to provide a method for treating the surface of thermoplastic elastomer compositions wherein the ecompositions are derived from a combination of specific starting materials.

It is further object of the present invention to provide a method for painting the surface of thermoplastic elastomer compositions which has been treated specifically.

Other and further objects, features and advantages of the present invention will now be apparent more fully from the the following description.

As a result of extensive research made by the present inventors to develop a new method for treating the surface of a molded article made of thermoplastic elastomer compositions which overcomes drawbacks as seen in the prior art, it has now been found that a thermoplastic elastomer composition obtained by thermal treatment in the presence of an organic peroxide of a mixture of an oil-extended olefinic copolymer rubber, an olefinic plastic and a bismaleimide compound in a specific proportion can be treated at the surface thereof by contacting with a UV-rays absorbing liquid and then irradiating it with UV-rays of a specific wave length. The present invention has been accomplished on the basis of the above finding.

In accordance with the present invention, there is provided a method for treating the surface of a molded article made of a thermoplastic elastomer composition, which comprises the steps of:

providing an shaped article made of a thermoplastic elastomer obtained by a thermal treatment of a mixture in the presence of an organic peroxide, which mixture is comprised of (A) an oil-extended olefinic copolymer rubber of an olefinic copolymer having a Mooney viscosity ($ML_{1+4}100°$ C.) of 90-200 incorporated with a softening agent of a mineral oil series, (B) an olefinic plastic substance, and (C) a bismaleimide compound, the ratio by weight of (A) the oil-extended olefinic copolymer rubber to (B) the olefinic plastic substance, A/B, being 24/76-80/20, the content of (C) the bismaleimide compound being 0.1-3 parts by weight based on 100 parts by weight of the total amount of (A) the oil-extended olefinic copolymer rubber and (B) the olefinic plastic substance, contacting the surface of the molded article with a UV-rays absorbing liquid, and irradiating the surface of the molded article with UV-rays having main wave lengths of 300 nm, or less.

DETAILED DESCRIPTION OF THE INVENTION

Below are a detailed description on the construction of the present invention.

(1) Starting material:

An olefinic copolymer rubbger (a) used for the production of the thermoplastic elastomer composition includes, random amorphous elastic copolymers containing an olefin as a predominant component, such as ethylene-propylene copolymer rubber, ethylene-propylene-non-conjugated diene copolymer rubber, ethylene-butene-non-conjugated copolymer rubber, propylene-butadiene copolymer rubber. In the present invention, the olefinic copolymer rubber containing 10-60% by weight of propylene is especially preferable. Also preferable in the present invention is especially ethylene-propylene-diene copolymer rubber. Illustrative of the preferable non-conjugated diene are, for example, dicyclopentadiene, 1,4-hexadiene, cyclooctadiene, ethylene-norbornene, ethylidene-norbornene. In particular, ethylidene-norbornene is most preferable. In ethylene-propylene-ethylidene-norbornene copolymer rubber (referred to hereinafter simply as EPDM), the content of propylene is 10-60% by weight, preferably 20-40% by weight while the content of ethylidene-norbornene is 1-30% by weight, preferably 3-20% by weight. It has a Mooney viscosity at 100° C. ($ML_{1+4}100°$ C.) of 90-200, preferably 120-170. If the content of propylene is less than 10% by weight, the resultant copolymer rubberrs will become poor in flexiblity. On the other hand, if the content exceeds 60% by weight, the resultant copolymer rubbers will be deteriorated in mechanical properties.

The olefinic copolymer rubber used in the present invention preferably has a Mooney viscosity ($ML_{1+4}100°$ C.) within the range of 90-200. If the Mooney viscosity is less than 90, the resultant composition will become poor in tensile properties which is necessary for impact-strength at a low temperature. On the other hand, if the Mooney viscosity exceeds 200, the resultant article obtained by injection molding will have gel-like lumps on its surface so that its tensile strength and impact-strength at a low temperature will be deteriorated.

In case of ethylene-propylene-non-conjugated diene copolymer rubber, the content of propylene is preferably 10-60% by weight. If the content of propylene is less than 10% by weight, the content of ethylene in the resultant copolymer rubber will correspondingly be larger so that it will show crystallinity and deteriotrate heat-resistance as the result. On the other hand, if the content of propylene exceeds 60% by weight, the decomposition reaction of the composition by an organic peroxide will excessively proceed.

The iodine value (the degree of unsaturation) of the olefinic copolymer rubber used in this invention is preferably less than 16, and within this range, a partially crosslinked composition well balanced in processability and rubbery properties can be obtained.

The mineral oil type softening agent (b) used in this invention is a process oil comprised of petroleum fractions of high boiling points belonging to paraffin type, naphthene type and aromatic type. This softening agent is used for the purpose of facilitating the processing in thermal treatments of olefinic copolymer rubbers or olefinic plastics, assisting dispersion of carbon black or the like enhancing processability of the resultant thermoplastic elastomer composition, and reducing hardness to increase flexibility and elasticity.

The oil-extended olefinic copolymer rubber (A) in the present invention is manufactured by incorporating the above mentioned olefinic coppolymer rubber (a) with the mineral oil type softening agent (b). The content of the mineral oil type softening agent (b) is 20-60 parts by weight based on 100 parts by weight of the olefinic copolymer rubber (a). If the softening agent of a mineral oil series (b) is less than 20 parts by weight, the resultant composition will become poor in processability on injection molding so that a flow mark will be generated in the resultant molded article or distortion of the article near the gate will be larger. On the other hand, if the content of the softening agent exceeds 60 parts by weight, the resultant molded article will be deteriorated in tensile strength and impact-strength at a low temperature and will extremely be damaged in its appearance as gel-like lumps are formed on the surface of article obtained by injection molding.

The Mooney viscosity of ethylene-propylene-ethylidene-norbornene copolymer rubber among the oil-extended olefinic copolymer rubbers is calculated by the following equation:

$$\log\left(\frac{ML_1}{ML_2}\right) = 0.0066 \, (\Delta PHR)$$

wherein $ML_1$ stands for the viscosity of EPDM, $ML_2$ for the viscosity of the oil-extended EPDM and $\Delta PHR$ for the amount of extended oil per 100 parts by weight of EPDM.

Illustrative of the olefinic plastic (B) used in this invention are, for example, isotactic polypropylene, a copolymer of propylene and a small amount of other α-olefin such as propylene-ethylene copolymer, propylene-butene-1 copolymer, propylene-hexene-1 copolymer and propylene-4-methyl-1-pentene copolymer.

It is preferred that an olefinic plastic is previously mixed with an organic peroxide and subjected to thermal decomposition to decrease the molecular weight of the substance thereby increasing its flow property. In case the olefinic plastic is subjected to thermal decomposition in the presence of an organic peroxide, an olefinic plastic having a melt index ($M_0$; measured according to JIS K7210, 230° C.) of 1-10 g/10 minutes, preferably 2-6 g/10 minutes is used before the thermal decomposition and is modified by thermal decomposition conducted in the presence of an organic peroxide to have a melt index ($M_1$) of 20-50 g/10 minutes, preferably 30-40 g/10 minutes. The ratio of the melt indices before and after the thermal decomposition ($M_1/M_0$) is 2-50. If the degree of thermal decomposition ($M_1/M_0$) of the olefinic plastic with an organic peroxide is less than 2, the resultant composition will be inferior in its flow property, or undesirable phenomenon such as flow mark will be observed on the surface of the resultant molded article by injection molding. On the other hand, if the degree of thermal decomposition ($M_1/M_0$) exceeds 50, the resultant article will be inferior in tensile characteristics necessary for impact-strength at a low temperature. The value of $M_1/M_0$ is preferably 3-40, more preferably 5-20.

Examples of the bismaleimide compound (C) used in this invention include N,N'-m-phenylene-bismaleimide and toluene-bis-maleimide. As N,N'-m-phenylene-bismaleimide are used, for example, commercially available HVA-2 (DuPont, U.S.A.) and Soxinol BM (Sumitomo Chem., Japan)

Illustrative of the organic peroxide (D) used in the present invention are, for example, 2,5-dimethyl-2,5-di(-tert-butylperoxy)hexane, 2,5-dimethyl-2,5-di(tert-butylperoxy)hexine-3, 1,3-bis(tert-butylperoxyisopropyl)benzene, 1,1-di(tert-butylperoxy)-3,5,5-trimethylcyclohexane, 2,5-dimethyl-2,5-di(peroxybenzoyl)hexine-3, and dicumyl peroxide. These compounds are used singly or may be used, if necessary, in mixture of at least two.

(2) proportion of the starting materials

The ratio by weight of the oil-extended olefinic copolymer rubber (A) to the olefinic plastic (B) in this invention is in the range of 24/76-80/20. If the ratio is smaller than 24/76, the crosslinking reaction by the organic peroxide will become insufficient and the copolymer rubber will be devoid of flexibility and low hardness which are required for the thermoplastic elastomer composition. On the other hand, if the ratio exceeds 80/20, the appearance of the resultant injection-molded article, which is regarded important for exterior parts for automobile will be damaged, and the article will be deteriorated in heat-resistance. The proportion of the bismaleimide compound (C) is in an amount of 0.1-3 parts by weight based on 100 parts by weight of the total amount (A+B) of the oil-extended olefinic copolymer rubber (A) and the olefinic plastic (B). If the proportion of the bismaleimide compound is less than 0.1 part by weight, improvement in the physical properties such as tensile property will be insufficient. On the other hand, if the proportion exceeds 3 parts by weight, a flow mark will be generated to deteriorate the appearance of the resultant molded article. The proportion of the organic peroxide is generally 0.01-1.5 parts by weight, preferably 0.01-1 part by weight based on 100 parts by weight of the total amount (A+B+C) of the oil-extended olefinic copolymer rubber (A), the olefinic plastic (B) and the bismaleimide compound (C).

(3) Production of the thermoplastic elastomer composition:

The production of the thermoplastic elastomer composition in the present invention is attained by mixing the oil-extended olefinic copolymer rubber (A), the olefinic plastic (B) and the bismaleimide compound (C) together and kneading the mixture under fusion. The kneading temperature in this case is within the range of 170°-280° C. Utilizable as the kneading apparatus are known conventional ones including a mixing roll, a Bambury mixer, an extruder, a kneader and a continuous mixer. In the kneading under fusion, it is important to disperse the bismaleimide compound homogeneously into the mixture. It is desirable to conduct kneading of these ingredients in the atmosphere of an inert gas such as nitrogen or carbon dioxide.

The resultant mixture is then subjected to a thermal treatment in the presence of an organic peroxide. This thermal treatment is carried out dynamically as in the above kneading by the aid of a conventional kneading apparatus. The temperature for the thermal treatment is within the range of 180°-300° C., preferably 180°-270° C. The thermoplastic elastomer composition possessing beneficial properties for molding materials is obtained by this thermal treatment.

The thermoplastic elastomer composition used in this invention may be incorporated, if necessary, with a filler such as carbon black, a lubricant, a pigment, a stabilizer, a UV-absorbing agent and the like additives or modifiers.

(4) The surface treatment and painting of molded articles made of the thermoplastic elastomer composition:

In accordance with the method of this invention, the thermoplastic elastomer composition is molded in any desired shape, and the surface of the molded article is brought into contact with the UV-absorbing liquid and then irradiated with UV-rays. By this surface treatment, the surface of the molded article is rendered active so that the surface is excellentlly adapted for painting. adhesion and printing. The molded article of the thermoplastic elastomer may be in any desired shape such as films, plates, fibers, etc. The UV-absorbing liquid may be a liquid carrying a UV-absorbing structure in its molecule or may be an ordinary solvent in which an additive having a UV-absorbing structure is dissolved. Examples of the former type include aromatic solvents such as benzene, toluene, and xylene; halogenated hydrocarbon solvents such as carbon tetrachloride, tetrachloroethylene. trichloroethylene, and 1,1,1-trichloroethane: and solvents of acrylic ester type. Examples of the latter type include ordinary solvents such as aromatic hydrocarbons, halogenated hydrocarbons, acrylic esters, and acrylamides in which are dissolved acetophenone derivatives, benzophenone derivatives, benzoin derivatives, sulfide derivatives, diazonium salt derivatives and the like photosensitizers. In the present invention, it is preferred to employ benzene, tetrachloroethylene, 1,1,1-trichloroethane and a mixed solvent of carbon tetrachloride-tetrachloroethylene.

The means for contacting the surface of the molded article with the liquid involves, in addition to immersing, spraying and coating. On contacting the surface of the molded article with the liquid, ultrasonic wave can be applied to the treatment so as to accelerate attaching the liquid onto the surface. The surface of the molded article is then irradiated with a UV-rays having wave lengths of 300 nm or less, in particular wave lengths of 254 nm and 185 nm as main active wave lengths. It is preferred to maintain the UV-rays at a higher strength.

In case the molded article of the thermoplastic elastomer composition is contacted on its surface with the UV-absorbing liquid in the present invention, it is preferable that the surface of the molded article is previously heated. Although a higher heating temperature is preferable, the temperature is generally higher than 30° C., preferably higher than 50° C. The time for contacting the surface of the molded article with the UV-absorbing liquid is within the period from 5 seconds to 10 minutes, preferably within the period from 5 seconds to 5 minutes. In the present invention, it is also possible to contact the surface of the molded article with the heated UV-absorbing liquid.

If the contact time is shorter than 5 seconds, the improving effect on acceptability to painting. adhesion and printing on the surface of the molded article will be insufficient. On the other hand, if the contact time is longer than 10 minutes, it will bring about economical disadvantage and will give an adverse effect as deterioration takes place on the surface.

The time for irradiation of UV-rays is within the period from 20 seconds to 10 minutes, preferably within the period from 30 seconds to 5 minutes. If the irradiation time is shorter than 20 seconds, the improving effect on acceptability to painting. adhesion and printing on the surface of the molded article will be insufficient. On the other hand, if the irradiation time is longer than 10 minutes, it will bring about economical disadvantage and will give an adverse effect as deterioration of the surface takes place.

A paint is then applied according to a known conventional method onto the molded article thus subjected to the surface treatment. In this case, the use of an acrylic paint or a polyurethane paint is preferable. In particular, polyurethane paints possess flexibility and so widely utilized for parts of automobiles and bicycles. Such polyurethane paints include paints having a polyurethane structure, such as acrylic polyurethane paints, polyester-polyurethane paints and modified polyurethane paints.

Paint-coated molded articles of the thermoplastic elastomer composition can widely be utilized in the following typical fields:

(1) exterior parts of automobile such as bumper, bumper corner and bumper air dam skirt, etc.
(2) exterior parts with ornamental function of automobile, such as side mole, steering wheel, splashboard, etc.
(3) electric appliances such as connector, cap plug, etc.

The present invention will be illustrated in more detail by way of Examples and Comparative Examples.

Testing Methods in Examples (1) Method for preparing test piece:

An elastomer composition sample was molded to prepare a flat panel of 100 mm in width, 400 mm in length and 3 mm in thickness by the aid of an injection molding machine (Neomat injection molding machine manufactured by Sumitomo Heavy Machinery Indus. Co.Ltd., Japan). This flat panel was used as sample in each test.

(2) Method for measuring physical properties:

(1) Initial adhesiveness of paint:

Test pieces for measurement were molded by using a 13 oz screw in line type injection molding machine (manufactured by Sumitomo Heavy Machinery Co., Ltd., Japan) and coated. The coating of the sample was cut with a razor into 100 (10 in longitudinal direction and 10 in lateral direction) small squres having 2 mm in size. A cellophane tape of 24 mm in width (manufactured by Nichiban Co., Ltd., Japan) was applied onto the coating by pressing with thumb and then peeled off quickly whereby the number of cut squares remaining on the sample was counted to obtain the ratio (%) of the residual cut squares. The initial adhesiveness was evaluated by this ratio.

EXAMPLE 1

In a Bambury mixer were placed 48 parts by weight of an oil-extended rubber (referred to hereinafter simply as oil-ex EPDM-1) prepared by incorporating 100 parts by weight of an ethylene-propylene-ethylidene-norbornene copolymer rubber having a Mooney viscosity ($ML_{1+4}100°$ C.) of 143, a propylene content of 25% by weight and an ethylidene-norbornene content of 5% by weight with 41 parts by weight of a paraffinic process oil, 52 parts by weight of polypropylene (referred to hereinafter simply as PP-1) having a melt index (JIS K-7210, 230° C., 2.16 kg) changed from 4 g/10 minutes to 30 g/10 minutes ($M_1/M_0 = 7.5$) by thermal decomposition and 0.4 parts by weight of N,N'-m-phenylene-bis-maleimide (referred to hereinafter simply as BM). The mixture was kneaded under fusion at 180° C. and for 8 minutes in nitrogen atmosphere. The kneaded mixture was then passed through rolls and a sheet cutter to form pellets (referred to hereinafter simply as CP-1).

Next, CP-1 and 0.07 parts by weight of 1,3-bis(tert-butylperoxyisopropyl)benzene (referred to hereinafter simply as PO-1) were mixed together in a tumbler blender, and the pellets were extruded at 240° C. by the aid of a 65 mm extruder in nitrogen atmosphere to obtain pellets of the thermoplastic elastomer composition. These pellets were molded by the above mentioned injection molding machine and the resultant test plate was immersed for one minutes in tetrachloroethylene as a solvent at 60° C. The test plate was placed in front of a UV-rays irradiating apparatus equipped with a low pressure mercury lamp (200W made of synthetic quartz) and irradiated for 1 minute with UV-rays having main active wave lengths of 254 nm and 185 nm in the air while maintaining the distance between the light source and the test plate at about 15 cm whereby the surface treatment of the test plate was carried out.

The surface of the test plate thus treated was then spray coated with a modified polyurethane paint (Flexthane #101, manufactured by Nippon Bee Chemical Co., Ltd., Japan), baked for 30 minutes at 120° C. and dried. The initial adhesiveness of the resultant paint-coated article was measured, and a result of the measurement is shown in Table 1.

EXAMPLE 2

A paint-coated article was manufactured in the same manner as described in Example 1 except that an acrylic polyurethane paint R271 (manufactured by Nippon Bee Chemical Co., Ltd.) was used as the paint and the test plate was spray coated with the paint, baked at 90° C. for 30 minutes and dried. The initial adhesiveness of the paint-coated article was measured, and a result of the measurement is shown in Table 1.

COMPARATIVE EXAMPLE 1

A paint-coated article was manufactured in the same manner as described in Example 1 except that the irradiation of UV-rays was not carried out. The initial adhesiveness of the paint-coated article was measured, and a result of the measurement is shown in Table 1.

COMPARATIVE EXAMPLE 2

A paint-coated article was manufactured in the same manner as described in Example 1 except that the immersion of the article in tetrachloroethylene solvent was not carried out. The initial adhesiveness of the paint-coated article was measured, and a result of the measurement is shown in Table 1.

COMPARATIVE EXAMPLE 3

A paint-coated article was manufactured in the same manner as described in Example 2 except that the irradiation of UV-rays was not carried out. The initial adhesiveness strength of the paint-coated article was measured, and a result of the measurement is shown in Table 1.

COMPARATIVE EXAMPLE 4

A paint-coated article was manufactured in the same manner as described in Example 2 except that the immersion of the article in tetrachloroethylene solvent was not carried out. The initial adhesiveness of the paint-coated article was measured, and a result of the measurement is shown in Table 1.

EXAMPLE 3

A paint-coated article was manufactured in the same manner as described in Example 1 except that a polypropylene having a melt index of 30 g/10 minutes (Sumitomo Noblen Z101A) was used in place of PP-1. The initial adhesiveness of the paint-coated article was measured, and a result of the measurement is shown in Table 2.

EXAMPLE 4

A paint-coated article was manufactured in the same manner as described in Example 3 except that the test plate was spray coated with the acrylic polyurethane paint R271 manufactured by Nippon Bee Chemical Co., Ltd., baked at 90° C. for 30 minutes and dried. The initial adhesiveness of the paint-coated article was measured, and a result of the measurement is shown in Table 2.

COMPARATIVE EXAMPLE 5

A paint-coated article was manufactured in the same manner as described in Example 3 except that the irradiation of UV-rays was not carried out. The initial adhesiveness of the paint-coated article was measured, and a result of the measurement is shown in Table 2.

COMPARATIVE EXAMPLE 6

A paint-coated article was manufactured in the same manner as described in Example 3 except that the immersion of the article in tetrachloroethylene solvent was not carried out. The initial adhesiveness of the paint-coated article was measured, and a result of the measurement is shown in Table 2.

COMPARATIVE EXAMPLE 7

A paint-coated article was manufactured in the same manner as described in Example 4 except that the irradiation of UV-rays was not carried out. The initial adhesiveness of the paint-coated article was measured, and a result of the measurement is shown in Table 2.

COMPARATIVE EXAMPLE 8

A paint-coated article was manufactured in the same manner as described in Example 4 except that the immersion of the test plate in tetrachloroethylene solvent was not carried out. The initial adhesiveness of the paint-coated article was measured, and a result of the measurement is shown in Table 2.

EXAMPLE 5

A paint-coated article was manufactured in the same manner as described in Example 2 except that the test plate was contacted with a vapor of 1,1,1-trichloroethane (74° C.) for 30 second and irradiated with UV-rays for 1 minute and 30 seconds. The initial adhesiveness of the paint-coated article was measured, and a result of the measurement in shown in Table 2.

According to this invention, molded articles of the thermoplastic elastomer furnished with excellent acceptability to painting, adhesion and printing can be obtained. In addition, a paint-coated article with excellent adhesiveness to the paint can be obtained by applying the pait to the article.

It is understood that the preceding representative embodiments may be varied within the scope of the present specification both as to ingredients and treatment conditions, by one skilled in the art to achieve essentially the same results.

As many widely, different embodiments of this invention may be made without departing from the sprit and scope thereof, it is to be construed that this invention is not limited to the specific embodiment thereof except as defined in the appended claims.

TABLE 1

| Example No. | Treatment Immersion in the solvent | Treatment Irradiation with UV rays | Sort of the paint | Initial adhesiveness (%) |
|---|---|---|---|---|
| 1 | Yes | Yes | Flexthane #101 | 100 |
| 2 | Yes | Yes | R271 | 100 |
| Com 1 | Yes | None | Flexthane #101 | 0 |
| Com 2 | None | Yes | Flexthane #101 | 0 |
| Com 3 | Yes | None | R271 | 0 |
| Com 4 | None | Yes | R271 | 0 |

TABLE 2

| Example No. | Treatment Immersion in the solvent | Treatment Irradiation with UV rays | Sort of the paint | Initial adhesiveness (%) |
|---|---|---|---|---|
| 3 | Yes | Yes | Flexthane #101 | 100 |
| 4 | Yes | Yes | R271 | 100 |
| Com 5 | Yes | None | Flexthane #101 | 0 |
| Com 6 | None | Yes | Flexthane #101 | 0 |
| Com 7 | Yes | None | R271 | 0 |
| Com 8 | None | Yes | R271 | 0 |
| 5 | Yes (Contact with vapor) | Yes | R271 | 100 |

What is claimed is:

1. A method for treating the surface of a molded article, which comprises the steps of:
    providing a molded article made of a thermoplastic elastomer composition obtained by a thermal treatment of a mixture in the presence of an organic peroxide, which mixture is comprised of (A) an oil-extended olefinic copolymer rubber comprising an olefinic copolymer rubber having a Mooney viscosity ($ML_{1+4}100°$ C.) of 90-200 and a mineral oil type softening agent, (B) an olefinic plastic, and (C) a bismaleimide compound, the ratio by weight of (A) the oil-extended olefinic copolymer rubber to (B) the olefinic plastic, A/B, being 24/76-80/20, the content of (C) the bismaleimide compound being 0.1-3 parts by weight based on 100 parts by weight of the total amount of (A) the oil-extended olefinic copolymer rubber and (B) the olefinic plastic,
    coating the surface of the molded article with a UV-ray absorbing liquid selected from the group consisting of aromatic solvents, halogenated hydrocarbon solvents, acrylic ester solvents and solvent solutions of photosensitizers, and
    irradiating the coated surface of the molded article with UV-rays having main wavelengths of 300 nm or less.

2. A method according to claim 1, wherein the content of the mineral oil type softening agent in (A) the oil-extended olefinic copolymer rubber is 20-60 parts by weight based on 100 parts by weight of the olefinic copolymer rubber.

3. A method according to claim 1, wherein the olefinic copolymer rubber is ethylene-propylene-non-conjugated-diene copolymer rubber.

4. A method according to claim 3, wherein the content of propylene in the ethylene-propylene-non-conjugated-diene copolymer rubber is 10–60% by weight.

5. A method according to claim 1, wherein (B) the olefinic plastic is previously thermally decomposed with an organic peroxide and has a melt index before the thermal decomposition ($M_0$) of 1–10 g/10 minutes and a melt index after the thermal decomposition ($M_1$) of 20–50 g/10 minutes, the ratio of $M_1/M_0$ being 2–50.

6. A method according to claim 1, wherein (B) the olefinic plastic is isotactic polypropylene or propylene-olefin copolymer.

7. A method according to claim 1, wherein (C) the bismaleimide compound is N,N'-m-phenylene-bismaleimide.

8. A method according to claim 1, further comprising coating the UV-rays-irradiated surface with a paint.

9. A method according to claim 8, wherein the paint is a polyurethane type paint.

10. The method of claim 1 wherein said UV-ray absorbing liquid is selected from the group consisting of benzene, toluene, xylene, carbon tetrachloride, tetrachloroethylene, trichloroethylene and 1,1,1-trichloroethane.

11. The method of claim 1 wherein said X-ray absorbing liquid is a solvent solution of a photosensitizer selected from the group consisting of acetophenone derivatives, benzophenone derivatives, benzoin derivatives, sulfide derivatives and diazonium salts.

12. The method of claim 1 wherein said X-ray absorbing liquid is benzene, tetrachloroethylene, 1,1,1-trichloroethane or a mixture of carbon tetrachloride and tetrachloroethane.

* * * * *